June 4, 1963  A. ARLAUSKAS  3,092,377
WINDOW REGULATOR
Filed April 21, 1960  3 Sheets-Sheet 1

INVENTOR.
Alfonsas Arlauskas
BY Herbert Furman
ATTORNEY

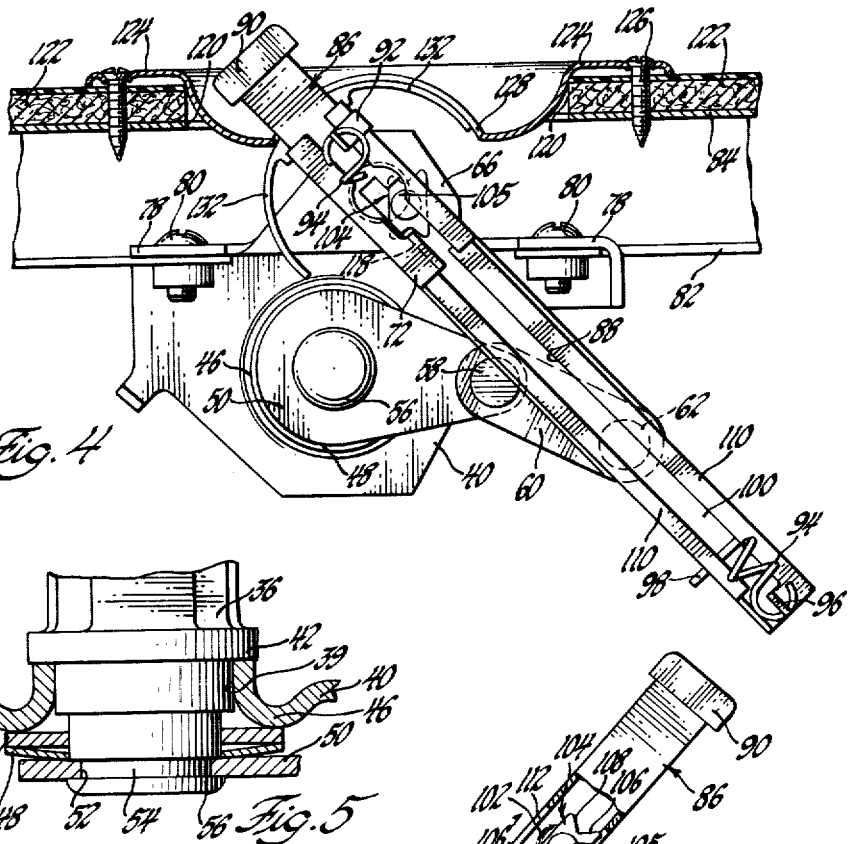
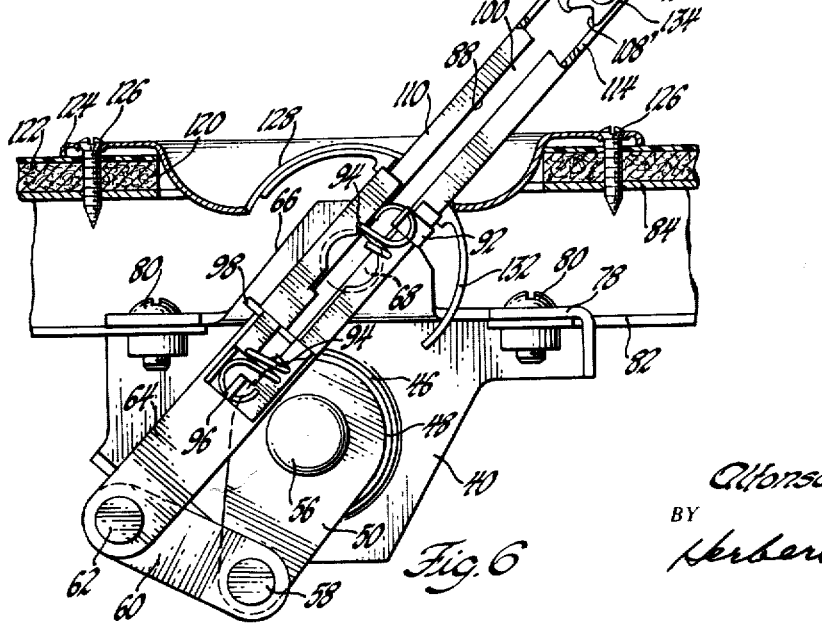

June 4, 1963 A. ARLAUSKAS 3,092,377
WINDOW REGULATOR

Filed April 21, 1960 3 Sheets-Sheet 3

INVENTOR.
Alfonsas Arlauskas
BY
Herbert Furman
ATTORNEY

United States Patent Office

3,092,377
Patented June 4, 1963

3,092,377
WINDOW REGULATOR
Alfonsas Arlauskas, Livonia, Mich., assignor to General Motors Corporation, Detroit, Mich., a corporation of Delaware
Filed Apr. 21, 1960, Ser. No. 23,741
4 Claims. (Cl. 268—121)

This invention relates to window regulator mechanisms and more particularly to window regulator mechanisms for movable vehicle windows.

The mechanism of this invention is particularly useful for swingable vehicle ventilation windows. At the present time such windows are usually moved between their open and closed positions by use of a manually operable crank handle which drives the window pivot shaft through a reduction gear arrangement. One primary disadvantage of such an arrangement is that the handle projects into the passenger compartment so as to present a safety hazard in the event of accident or quick stop. Another disadvantage lies in the location of the handle with respect to the operator. In certain instances, the handle is placed forwardly and downwardly of the operator so as to make it somewhat awkward for him to turn the handle.

The mechanism of this invention overcomes these disadvantages of conventional window regulator mechanisms by providing an extendable and retractable handle rotatably mounted on the body immediately below the window and operatively connected to the window pivot shaft by a link and lever arrangement. When the handle is in its extended position, it extends a sufficient distance within the passenger compartment so that the operator can easily grasp the handle and by either moving the handle forwardly or rearwardly, easily move the window to whatever position desired. When the handle is not in use, it is moved to its retracted position, and a latch arrangement automatically holds the handle in this position so that no portion of the handle projects within the body. In order to release the handle, the operator merely moves the handle slightly beyond its retracted position to release the latch arrangement, and the handle is thereupon quickly and automatically moved to its extended position ready for use.

The primary object of this invention is to provide a new and improved window regulator mechanism. Another object of this invention is to provide a new and improved operating means for window regulator mechanisms which includes an extendable and retractable handle and a latching arrangement for holding the handle in retracted position when not in use and for easily and quickly moving the handle in its extended position whenever desired.

These and other objects of this invention will be readily apparent from the following specification and drawings wherein:

FIGURE 4 is a view taken generally along the plane indicated by line 4—4 of FIGURE 1, and showing the handle in retracted position;

FIGURE 5 is a sectional view taken generally along the plane indicated by line 5—5 of FIGURE 2;

FIGURE 6 is a view similar to FIGURE 4 and showing the handle in extended position;

Figure 1:
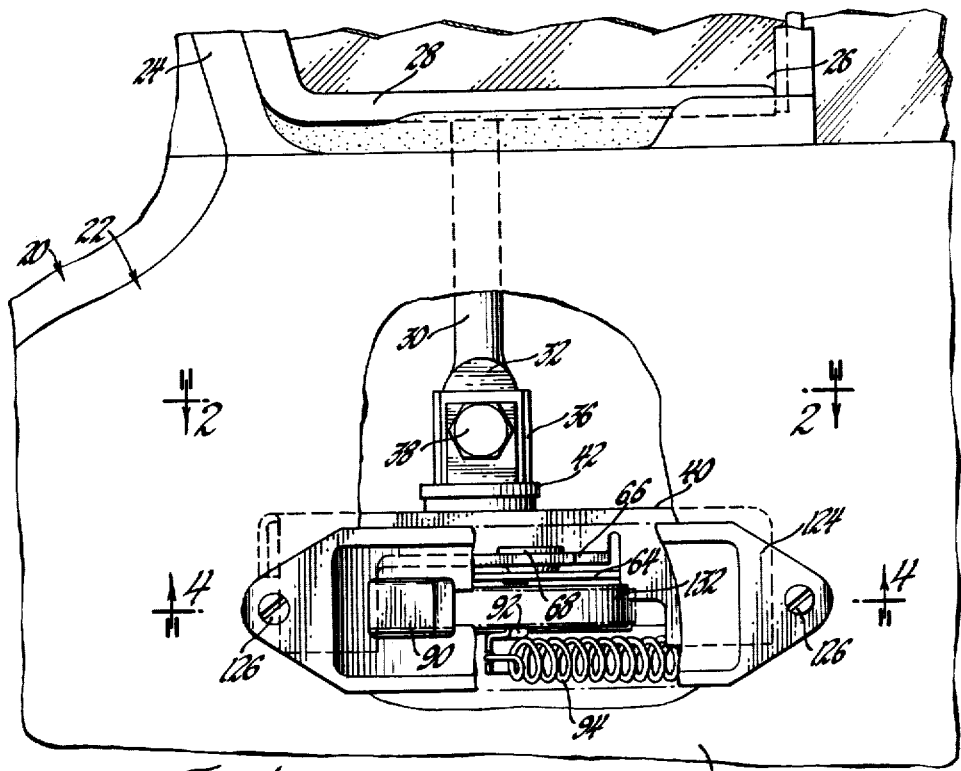
FIGURE 1 is a partially broken away partial side elevational view of a vehicle body embodying a window regulator mechanism according to this invention.

Referring now particularly to FIGURE 1 of the drawings, a vehicle body 20 includes a front door 22 having a door window frame 24 defining a ventilation window opening which is opened and closed by a swingable ventilation window 26, shown in closed position. Window 26 is fixedly mounted in a window frame 28 and is pivotally supported on door 22 for swinging movement between opened and closed positions by an upper pivot shaft, not shown, and a lower pivot shaft 30 aligned therewith.

Figure 2:
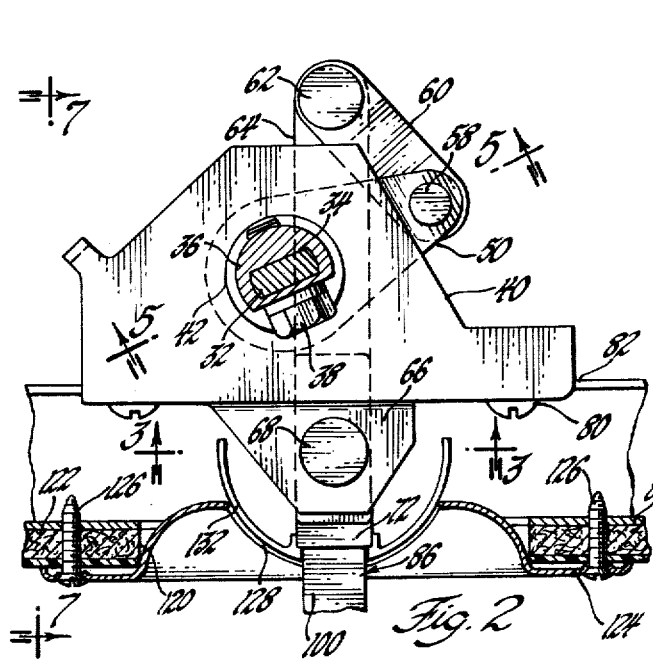
FIGURE 2 is a view taken generally along the plane indicated by line 2—2 of FIGURE 1.

The lower flattened end 32 of shaft 30 is received within a complementary-shaped bore 34 of a stub shaft 36, FIGURE 2, and secured therein by a bolt 38. As shown in FIGURE 5, shaft 36 is rotatably mounted within a flanged opening 39 of a support bracket 40 by means of an annular shoulder 42 of the shaft bearing upon the upper edge of the flanged opening. A washer 44 is rotatably mounted on the shaft 36 and bears against a rib 46 of the bracket 40. A Belleville spring washer 48 fits against the washer 46 and a lever 50 compresses the washer 48. Lever 50 is provided with a square or other regularly-shaped opening 52 which receives a complementary-shaped portion 54 of shaft 36 so as to non-rotatably couple the lever and shaft, with the end of the shaft 36 being headed over at 56 to secure the lever and shaft together and to also locate the shaft with respect to the washers and the flanged opening 39.

Figure 3:
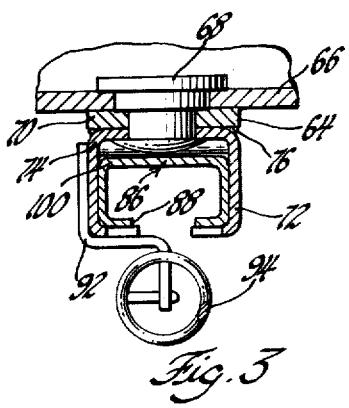
FIGURE 3 is an enlarged sectional view taken generally along the plane indicated by line 3—3 of FIGURE 2.
Figure 7:
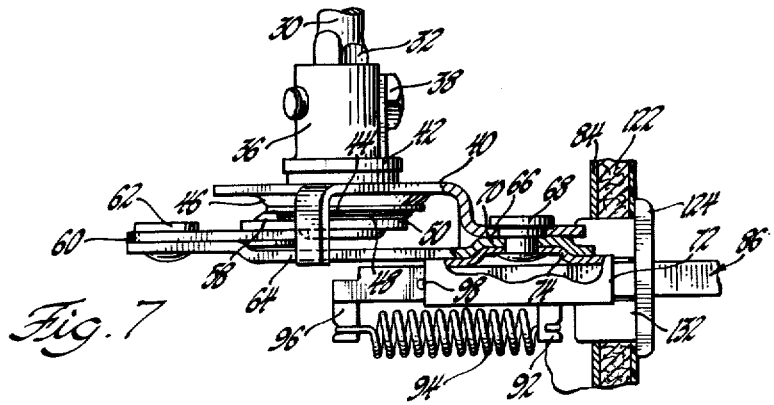
FIGURE 7 is a partially broken away view taken generally along the plane indicated by line 7—7 of FIGURE 2.

The free end of lever 50 is pivoted at 58 to one end of a link 60, FIGURES 2, 4, and 5. The other end of link 60 is pivoted at 62 to one end of a lever 64. As best shown in FIGURES 2, 3, and 7 of the drawings, the support bracket 40 is provided with a struck out, laterally extending apertured ear 66 which rotatably supports a headed stud 68. Lever 64 is provided with an upwardly embossed apertured portion 70 rotatably mounted on stud 68 so as to rotatably mount the lever on the bracket 40 and couple the lever to the shaft 36 by means of link 60 and lever 50. A channel-shaped guide or operating member 72 is also provided with an upwardly embossed apertured portion 74 in the base thereof which mates with the portion 70 of lever 64, with the guide and lever being secured in place by heading over the lower end of the stud 68 as shown in FIGURE 6. The guide 72 is welded at 76 to the lever 64 as clearly shown in FIGURE 3, whereby the guide and lever are rotatable as a unit about the axis of the stud 68.

As shown in FIGURES 4 and 6, the support bracket 40 is provided with a pair of downwardly extending ears 78 to either side of the ear 66, with the ears 78 being bolted at 80 to a bracket 82. Bracket 82 is suitably mounted on the door inner panel 84 of door 22 so as to mount the bracket 40 thereon.

A tubular handle 86 is slidably supported by the guide 72. Handle 86 is generally of rectangular cross section and includes a slot 88 in the lower wall thereof and an end cap 90. As best shown in FIGURE 3, an angle bracket 92 is secured to the guide 72 and anchors one end of a tension spring 94. The other end of spring 94 is hooked over an ear 96 which is struck out from the lower wall of handle 86 at the inner end thereof. The spring 94 continually biases the handle 86 outwardly of the guide 72 to its extended position as shown in FIGURE 6 with the handle being located in this position with respect to the guide by a pin 98 anchored in the opposite side walls of the handle and engaging one of the side walls of the guide 72.

Figure 8:
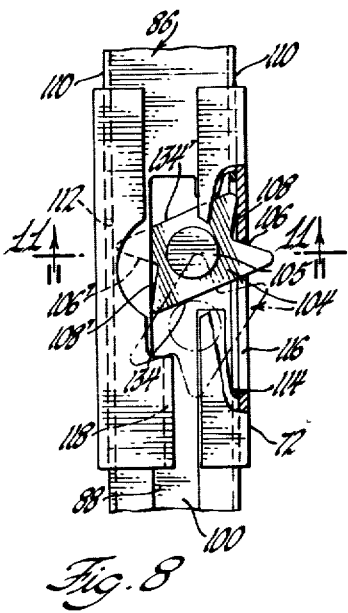
FIGURE 8 is an enlarged view showing the position of a portion of the latching arrangement when the handle is in a retracted latched position.
Figure 9:
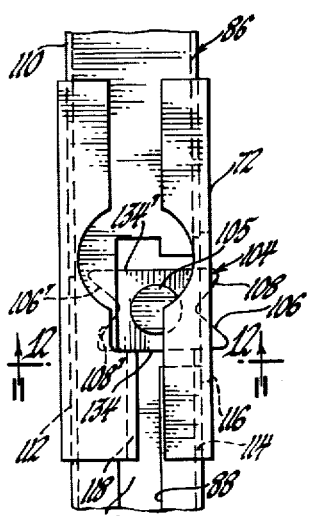
FIGURE 9 is a view showing the position of the portion of the latch arrangement of FIGURE 8 when the handle is in an intermediate position.
Figure 10:
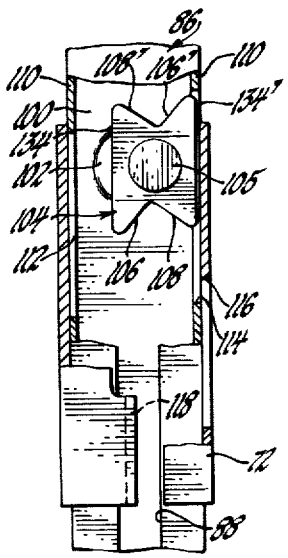
FIGURE 10 is a view showing the position of the portion of the latch arrangement of FIGURE 8 when the handle is in an extended position.
Figure 11:
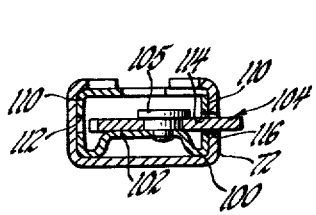
FIGURE 11 is a sectional view taken generally along the plane indicated by line 11—11 of FIGURE 8; and, FIGURE 12 is a sectional view taken generally along the plane indicated by line 12—12 of FIGURE 9.
Figure 12:
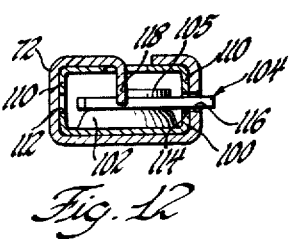

Since the handle 86 is biased to its extended position, some means must be provided to hold the handle in its retracted position as shown in FIGURE 4. A latching means for accomplishing this purpose is provided between the handle 86 and the guide 72, and this latching means will now be described with particular reference to FIGURES 4, 6, and 8 through 12 of the drawings. As best shown in FIGURES 11 and 12, the upper wall 100 of handle 86 is provided with a circular embossment 102. A star cam 104 is pivoted at 105 to embossment 102, and is freely rotatable with respect to the embossment and the handle 86. As can be seen in FIGURES 8 through 10, the axis of swinging of the star cam is located to one side of the longitudinal axis of movement of the handle 86. The star cam 104 is asymmetric about its pivot axis and includes edges 106 and 108 at one end thereof which are located generally normal to each other, and complementary edges 106' and 108' at the other end thereof which are similar to the edges 106 and 108 and are respectively parallel thereto. The side walls 110 of handle 86 are provided with longitudinally extending slots 112 and 114, which lie in the plane of swinging movement of the cam 104. The inner end portion of slot 114 is adapted to be aligned with a shorter longitudinally-extending slot 116 in one of the side walls of the guide 72 in one position of handle 86 as shown in FIGURE 8. The guide 72 is further provided with a laterally, upwardly extending tab 118 which projects within the slot 88 of handle 86 so as to be engaged by the star cam, as will be further described.

The handle 86 moves inwardly and outwardly of the inner panel 84 of door 22 through an opening 120 provided therein and also in the inner trim pad 122. An escutcheon 124 fits within the opening 120 and is secured to the inner panel at 126. Escutcheon 124 includes an insert central semi-circular slotted rib 128 which receives the handle 86. A semi-circular closure plate 132 is fixed to the guide 72 and is located in slidable relationship to the inner wall of rib 128. Thus, as handle 86 moves within the slot of rib 128, that portion of the slot not occupied by the handle is closed.

The handle 86 is shown in an extended position in FIGURE 6, and in this position it will be noted that the handle can be moved to the left by the operator to swing the handle, the guide 72, and the lever 64 counterclockwise about the axis of pin 68 so as to shift link 60 to the right and swing lever 50 counterclockwise. This will rotate shaft 36 and the lower shaft 30 of window 26 to thereby move the window from its closed to any open position desired. In this position of handle 86, it will be noted that the star cam 104 is located longitudinally of the handle 86 with one of the side edges 134 of the cam slightly within the slot 114.

When the operator desires to moves the handle 86 to its retracted position, he will move the handle 86 inwardly of guide 72 against the action of spring 94 until the edge 106' of the star cam engages the tab 118 of the guide 72 so as to rotate the cam 104 slightly clockwise to its position shown in dot-dash lines in FIGURE 8 wherein the leg of the cam which includes edge 106 projects through slots 114 and 116. Thereafter, the operator releases handle 86 and spring 94 moves the handle slightly outwardly until edge 108 of the cam engages the locking surface provided by the inner surface of the one wall of guide 72 and the edge 106 engages the locking surface provided by the outer end of slot 116 so as to hold the handle 86 in retracted position against the action of the spring 94.

In order to rotate the star cam to its latched position, it will be noted that the handle 86 must be moved inwardly beyond its retracted position and then released with the handle being returned to its retracted latched position by spring 94.

If it is later desired to move the handle 86 to its extended position, the operator moves the handle 86 from its retracted latched position slightly inwardly of the guide 72 until the edge 134 of the cam engages tab 118 as shown in FIGURE 9 to rotate the cam from its position of FIGURE 8 to its unlatched position of FIGURE 9 wherein the legs of the cam which include edges 106 and 108 project outwardly of slots 114 and 116. Then, the operator need only release the handle 86 and the spring 94 will move the handle outwardly to its extended position. As the handle moves outwardly of the body, the edge 134' opposite the edge 134 will engage the outer end wall of slot 116 to rotate the cam to its position as shown in FIGURE 10 wherein the cam 104 will not interfere with the outward movement of the handle 86 relative to the guide 72.

From the foregoing description, it will be noted that the cam 104 rotates 180° for each sequence of movement of the handle 86 between an extended, a retracted and an extended position whereby the edges 106 and 108 alternate in their latching engagement with the edges 106' and 108'. It will further be noted that the edges 106 and 106' are longer than the edges 108 and 108' to insure that the former will be picked up by tab 118 when handle 86 is moved to a retracted latched position.

Thus, this invention provides a new and improved window regulator mechanism for movable vehicle windows.

I claim:

1. The combination comprising, a support, a vehicle window mounted on said support for movement between opened and closed positions, an operating member swingably mounted on said support, means operatively connecting said member to said window to move said window upon swinging movement of said member, a handle mounted on said member for swinging movement therewith as a unit and linear movement relative thereto between extended and retracted positions, resilient means biasing said handle to said extended position thereof wherein said handle is manually operable to swing said handle and member as a unit and thereby move said window, latch means operative upon movement of said handle to said retracted position thereof to retain said handle in said position against the action of said resilient means, and means operative upon movement of said handle to a position slightly beyond said retracted position to release said latch means and permit said resilient means to move said handle to said extended position thereof.

2. The combination comprising, a support, a vehicle window mounted on said support for movement between opened and closed positions, an operating member swingably mounted on said support, means operatively connecting said member to said window to move said window upon swinging movement of said member, a handle member mounted on said operating member for movement therewith as a unit and movement relative thereto between extended and retracted positions, resilient means biasing said handle member to said extended position thereof wherein said members are swingable as a unit to move said window, and locking means operative upon movement of said handle member to said retracted position thereof to retain said handle member in said position against the action of said resilient means, said locking means including latch means mounted on one of said members for movement between a first position wherein said latch means is engageable with means on the other of said members under the action of said resilient means to block movement of said latch means and a second position wherein said latch means is out of engagement with said means on said other of said members to permit said resilient means to move said handle member to said extended position thereof, said latch means being movable between said first and second positions upon movement of said handle member between said retracted position and a position slightly beyond said retracted position.

3. The combination comprising, a support, a vehicle window mounted on said support for movement between opened and closed positions, an operating member swingably mounted on said support, means operatively connecting said member to said window to move said window upon swinging movement of said member, a handle member mounted on said operating member for movement therewith as a unit and movement relative thereto between extended and retracted positions, resilient means biasing said handle member to said extended position thereof wherein said members are swingable as a unit to move said window, and locking means operative upon movement of said handle member to said retracted position thereof to retain said handle member in said position against the action of said resilient means, said locking means including latch means movably mounted on one of said members, retaining means mounted on the other of said members, said latch means being movable between a first position wherein said latch means is engageable with said retaining means under the action of said resilient means to block movement of said latch means, and a second position wherein said latch means is out of engagement with said retaining means, and means engageable by said latch means upon movement of said handle member to said retracted position thereof to move said latch means to said first position thereof, said engageable means moving said latch means for said first position thereof to said second position thereof upon movement of said operating member from said retracted position thereof to a position slightly beyond said retracted position.

4. The combination comprising, a support, a vehicle window mounted on said support for movement between opened and closed positions, an operating member swingably mounted on said support, means operatively connecting said member to said window to move said window upon swinging movement of said member, a handle member mounted on said operating member for movement therewith as a unit and movement relative thereto between extended and retracted positions, resilient means biasing said handle member to said extended position thereof wherein said members are swingable as a unit to move said window, and locking means operative upon movement of said handle member to said retracted position thereof to retain said handle member in said position against the action of said resilient means, said locking means including latch means rotatably mounted on one of said members, retaining means on the other of said members engageable with said latch means in the retracted position of said handle member under the action of said resilient means to block rotational movement of said latch means, said latch means being rotatable between a first position out of engagement with said retaining means upon movement of said members relative to each other and a second position wherein said latch means will engage said retaining means upon movement of said handle member to said retracted position thereof, and means on said other of said members for rotating said latch means between said first and second positions.

References Cited in the file of this patent

UNITED STATES PATENTS

| | | |
|---|---|---|
| 2,624,570 | Dennis | Jan. 6, 1953 |
| 2,881,483 | Ginther | Apr. 14, 1959 |
| 2,949,290 | Hezler | Aug. 16, 1960 |

UNITED STATES PATENT OFFICE

CERTIFICATE OF CORRECTION

Patent No. 3,092,377 June 4, 1963

Alfonsas Arlauskas

It is hereby certified that error appears in the above numbered patent requiring correction and that the said Letters Patent should read as corrected below.

Column 3, line 43, for "insert" read -- inset --; column 5, line 31, for "for" read -- from --.

Signed and sealed this 10th day of December 1963.

(SEAL)
Attest:
ERNEST W. SWIDER

Attesting Officer

EDWIN L. REYNOLDS

Acting Commissioner of Patents